(12) United States Patent
Roberts

(10) Patent No.: US 6,908,097 B2
(45) Date of Patent: Jun. 21, 2005

(54) TOW-BARS

(76) Inventor: Peter J. Roberts, 38 Robinson Street, Brighton East, VIC 3187 (AU)

( * ) Notice: Subject to any disclaimer, the term of this patent is extended or adjusted under 35 U.S.C. 154(b) by 0 days.

(21) Appl. No.: 10/438,321

(22) Filed: May 15, 2003

(65) Prior Publication Data

US 2004/0017061 A1 Jan. 29, 2004

(30) Foreign Application Priority Data

May 17, 2002 (AU) .............................................. PS2393

(51) Int. Cl.7 ............................................... B60D 1/60
(52) U.S. Cl. ...................................... 280/507; 280/504
(58) Field of Search ................................ 280/504, 507, 280/511

(56) References Cited

U.S. PATENT DOCUMENTS

| 5,549,316 A | * | 8/1996 | Jones | 280/477 |
| 5,603,178 A | * | 2/1997 | Morrison | 40/591 |
| 5,647,621 A | * | 7/1997 | McClellan | 293/117 |
| 6,079,136 A | * | 6/2000 | Kozlarek | 40/541 |
| 6,247,257 B1 | * | 6/2001 | Powell | 40/591 |

* cited by examiner

Primary Examiner—Lesley D. Morris
Assistant Examiner—L. Lum
(74) Attorney, Agent, or Firm—Stites & Harbison PLLC; Ross F. Hunt, Jr.

(57) ABSTRACT

A protective device for use with a tow-bar having a towing hitch coupling. The protective device includes a substantially T-shaped member. The leg of the T is adapted to be coupled to the towing hitch coupling and the head of the T extends rearwardly of the towing vehicle past any rearwardly projecting components of the vehicle.

8 Claims, 2 Drawing Sheets

TOW-BARS

FIELD OF THE INVENTION

This invention relates to improvements to tow-bars and in particular relates to an additional component that can be used with a conventional tow-bar.

BACKGROUND OF THE INVENTION

Many vehicles such as cars and four wheel drives are these days fitted with tow-bars.

Conventional tow-bars comprise a bar that is mounted to the rear of the towing vehicle through a number of mounting points to distribute the towing load. The bar is a sturdy steel construction and is coupled to a towing hitch that includes an upstanding tow-ball that is adapted to fit on a towing socket that is provided on the vehicle that is to be towed. The ball and socket means of attachment is the most common means of attaching a trailer to a tow-bar. However to allow the vehicle to turn relative to the trailer it is important that there is space between the rear of the vehicle and the tow-ball, thus towing hitches have the effect of causing the tow-ball to project rearwardly of the vehicle. This rearward projection of the tow-ball is potentially hazardous both in terms of the damage that it can cause to a vehicle that may make a slow speed collision with the rear of the vehicle and the damage it does to pedestrians' legs as they walk behind the vehicle and do not see the tow-ball which is comparatively close to the ground. Many pedestrians have severely bruised their shins in this manner.

Many towing hitches can be removed from the tow-bar by either removal of a locking pin that holds the hitches in position or unbolting the towing hitch from the bar. The problem with removing the towing hitch is that most tow-bars also include an electrical socket into which a plug from the trailer can be inserted to enable the trailer to display turning, tail and stop lights. If the towing hitch is removed from the tow-bar and a vehicle was to make a slow speed collision with a towing vehicle, the electrical socket, because it often projects rearwardly of the vehicle, takes the full impact of the load and thus is easily damaged.

SUMMARY OF THE INVENTION

It is these issues that have brought about the present invention.

In accordance with the present invention there is provided a protective device for use with a tow-bar having a bar and a towing hitch coupling, the protective device comprising a substantially T-shaped member whereby the leg of the T is to be coupled to the towing hitch coupling, and the head of the T extends rearwardly of the towing vehicle past any rearwardly projecting components of the vehicle.

The T piece preferably comprises a post welded to a metal plate with the plane of the plate perpendicular to the longitudinal axis of the post. The post including means to facilitate attachment to a tow-bar. The post is preferably of square cross-section and is adapted to be a sliding fit within the interior of a coupling bracket welded to the towing bar. Apertures are positioned across the post to accommodate a locking pin that extends through the bracket on the towing bar and through the apertures on the post of the T-shaped member. The head of the T-shaped member may be asymmetrically mounted to the post.

BRIEF DESCRIPTION OF THE DRAWINGS

Embodiments of the present invention will now be described by way of example only with reference to the accompanying drawings in which.

DESCRIPTION OF THE PREFERRED EMBODIMENTS

Figure 1:
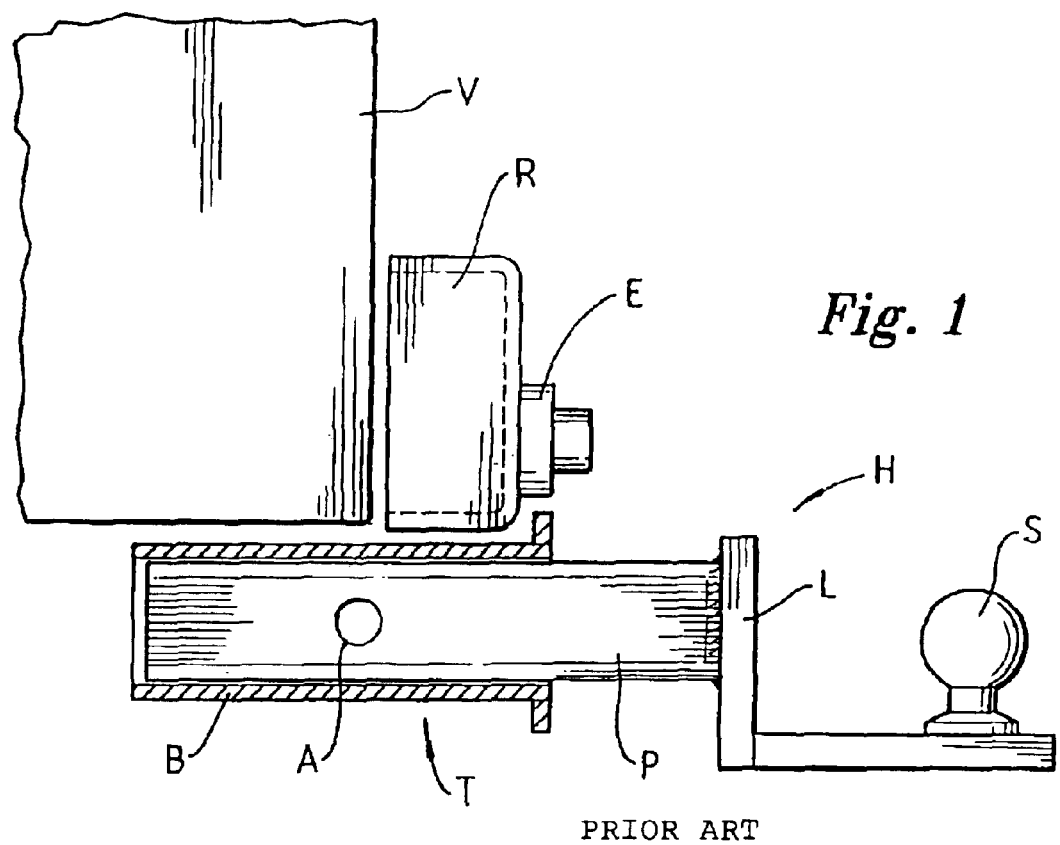
FIG. 1 is a schematic illustration of a conventional prior art tow-bar and towing hitch.

In FIG. 1, the conventional layout of a tow-bar T and towing hitch H is schematically illustrated. This is the prior art assembly that is frequently used on vehicle such as four wheel drive vehicles.

The tow-bar T of such vehicles comprises a sturdy steel bracket assembly (not shown) that is bolted to the chassis of the vehicle V in a number of spaced positions in order to distribute the towing load across the rear of the vehicle. A towing hitch H is attached to the towing bar T via a towing hitch coupling to project rearwardly of the vehicle for attachment to the trailer or the vehicle that is to be towed. The towing hitch coupling is illustrated as bracket B which is usually in the form of an elongate steel tube with a square or rectangular interior. The towing hitch H has a similarly profiled square post P that is a sliding fit within the interior of the bracket B. An aperture A extends through the walls of the bracket B and the towing hitch H and a large pin (not shown) extends through the apertures to hold the assembly together. Various means can be positioned on the end of the locking pin to prevent removal including keyed locks.

The projecting end of the post is then welded to an L-shaped plate L that projects rearwardly and has bolted to it a conventional tow-ball S. The distance between the tow-ball S and the rear of the vehicle V is selected to allow the vehicle to turn relative to the trailer without the trailer fouling the rear of the vehicle V.

Trailers are usually by law required to include a lighting system, namely tail lights, stop lights and turning lights. It is thus usual for trailers to have a plug that can be coupled to a socket E mounted on the rear of the vehicle to effect transfer of the vehicle's lighting to the trailer. The usual position of the electrical socket E is such that if the towing hitch H is removed from the tow-bar T in situations where the vehicle is not used for towing, the most rearwardly projecting component of the vehicle is the electrical socket E which leaves the socket E very vulnerable to damage especially during parking.

The invention as illustrated in FIGS. 2 to 5 essentially comprise a device 10 that can replace the towing hitch H when not required to protect the electrical socket E and other componentry at the rear of the vehicle V. The device 10 is essentially a protector that is adapted to be attached to the tow-bar T in the same manner as the towing hitch H.

Thus, the protector 10 comprises a square shaped post 11 that is adapted to be a sliding fit within the female bracket B that is part of the tow-bar T. If the bracket B of the towing hitch H happens to not be in the form of an elongate square tube, post 11 can be modified in shape to a corresponding construction to the bracket thereby enabling coupling of the protective device 10 and bracket B.

The post 11 has apertures 20, 21 and 22 extending laterally across the post to accommodate a locking pin (not shown) in exactly the same manner shown in FIG. 1. The post 11 is welded to a rectangular steel plate 14 and the mounting is such that the plane of the steel plate 14 is rearward of the furthest projection of the vehicle V. Thus, should a vehicle V carrying the protector 10 be involved in small contact during parking or from collision with a vehicle from the rear, the collision would occur first with the plate 14 thereby protecting the potentially vulnerable electrical socket E and rear bumper bar R of the vehicle and minimising damage to the front of the rear vehicle.

Figure 2:
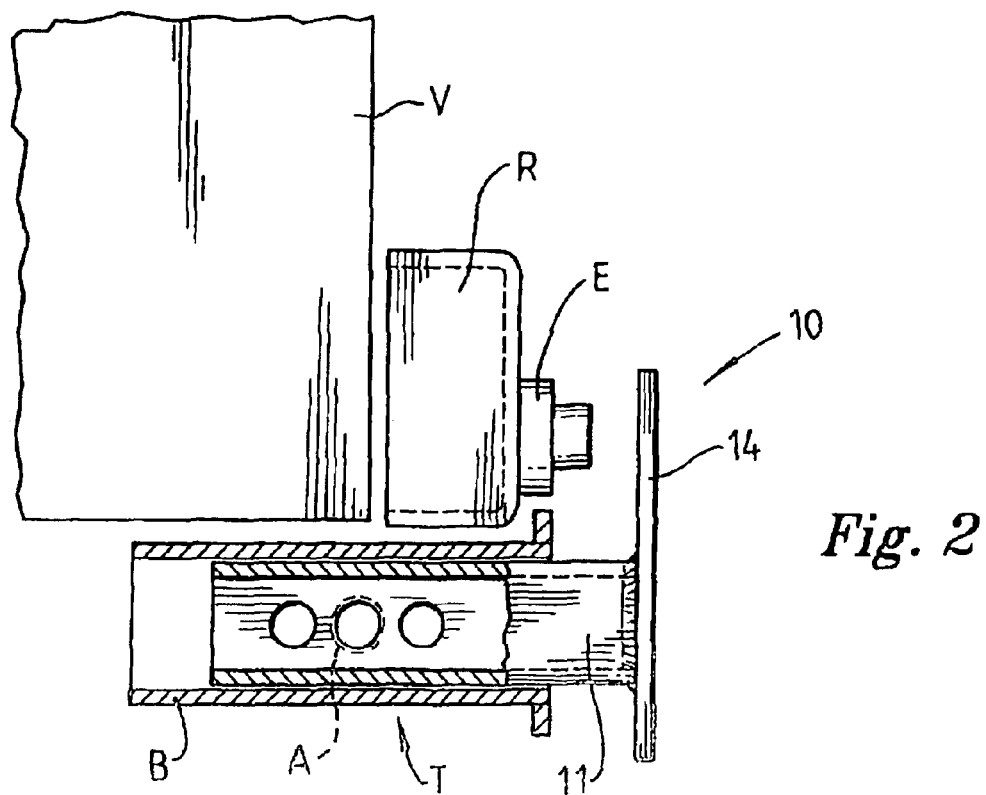
FIG. 2 is a schematic illustration of a towing bar with the towing hitch removed and replaced by a protective device in accordance with one embodiment of the invention.

The size of the plate 14 is sufficient to take small impact loads and although a planar rectangular plate is illustrated in FIG. 2 it is understood that other profiles are envisaged including plates that present a convexly curved surface.

Figure 3:
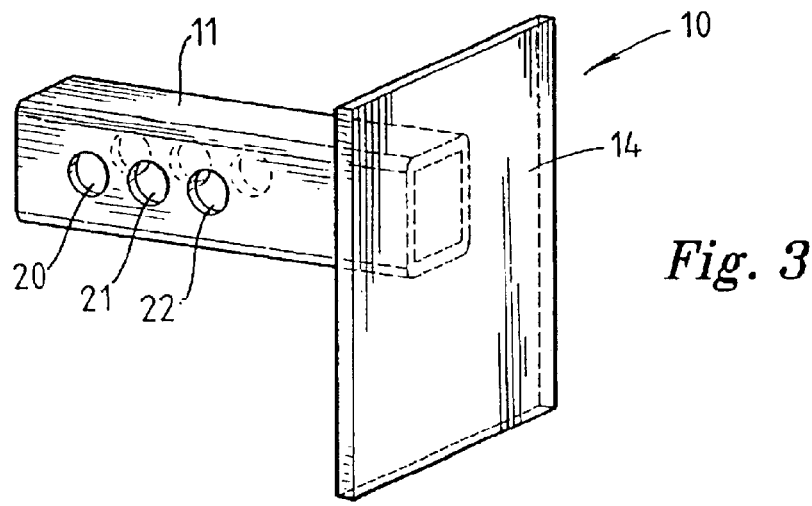
FIG. 3 is a perspective view of the protective device.
Figure 4A:
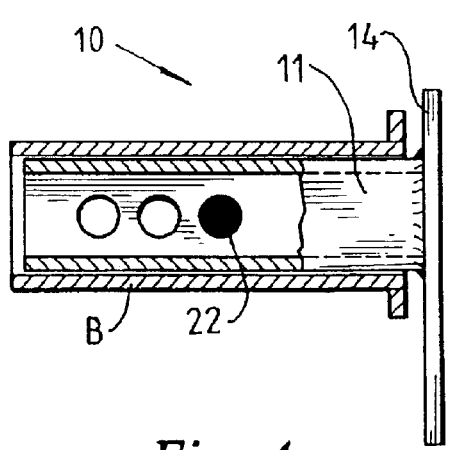
FIGS. 4a and 4b show the device in two mounting positions.
Figure 4B:
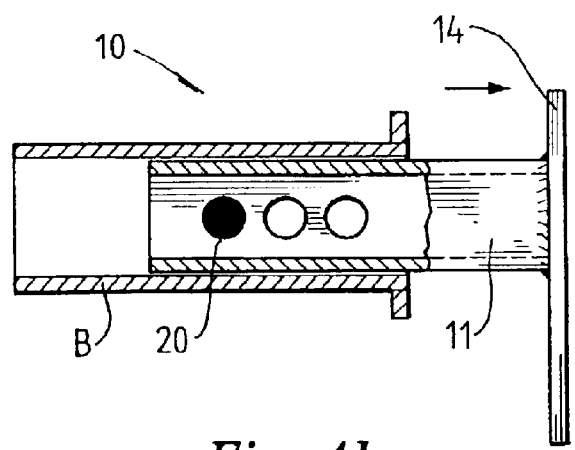

In FIGS. 3 to 5 the device 10 has a series of three pairs 20, 21, 22 of holes along the post so that as shown in FIGS. 4a and 4b the degree of protection of the plate 14 can vary depending on which pair of holes is selected to locate the pin.

Figure 5A:
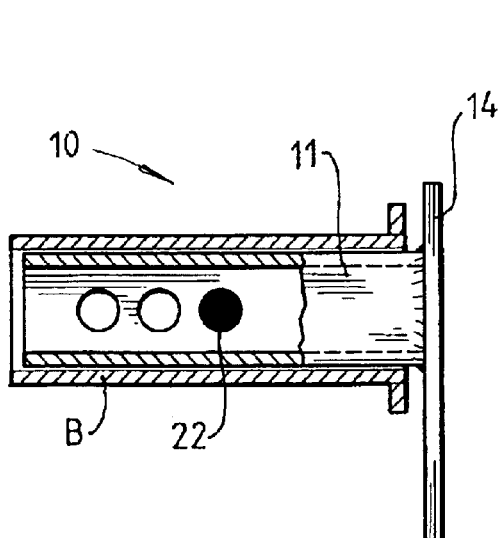
FIGS. 5a and 5b show the device at two different heights.
Figure 5B:
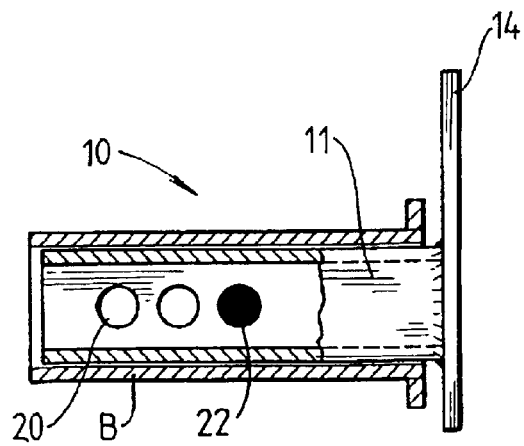

The plate 14 is also asymmetrically located on the post to allow, as shown in FIGS. 5a and 5b, selection of the height of the plate 14 relative to the vehicle. The device may also be coupled to the bracket B in more than one orientation as shown in FIGS. 5a and 5b vertical inversion of the direction of the device 10 alters to the effective height of the plate 14.

It is also understood that whilst the protector is preferably constructed of mild steel it can be chrome plated, painted or galvanised. The protector could also be made of reinforced plastics or reinforced fiberglass products with the inherent strength to resist low speed, low impact loads.

Although a locking pin is the preferred way of attaching the protector to the tow-bar it is understood that other forms of attachment are also envisaged including bolting the assembly to the tow-bar.

What is claimed is:

1. A protective device replacing a tow-bar on a towing vehicle having a towing hitch coupling, the protective device comprising a substantially T-shaped unitary member comprising a plate, and a post having a longitudinal axis and being fixed to the plate, the plate being elongated and being longitudinally oriented vertical to the ground, defining a plane perpendicular to the longitudinal axis of the post, such that when the post of the T-shaped member is coupled to the towing hitch coupling, the plate of the T-shaped member extends rearwardly of the towing vehicle past any rearwardly projecting components of the vehicle, the plate being made of a material, and having a thickness, so as to be sufficiently strong to bear a load resulting from a low impact to the rear of a towing vehicle and to distribute the load across the plate to thereby minimize vehicle damage.

2. The protective device according to claim 1 wherein the T-shaped member is made from metal, plastics or fiberglass.

3. The protective device according to claim 1 wherein the post has a square cross-section and is a sliding fit within an interior of a coupling bracket of the towing hitch coupling.

4. The protective device according to claim 1 wherein a plurality of apertures are positioned across the post of the T-shaped member to accommodate a locking pin that extends through a bracket on the towing hitch coupling and through one of the apertures on the post to thereby mount the protective device to the towing vehicle and adjust the effective length and the protective device.

5. The protective device according to claim 1 wherein the plate of the T-shaped member is asymmetrically mounted to the post.

6. The protective device according to claim 5 whereby the device is adapted to be coupled to the towing hitch coupling in more than one orientation.

7. The protective device according to claim 6 wherein the protective device is adapted to be coupled to the towing hitch in orientations 180° apart from one another so as to raise or lower an effective height of the plate off the ground.

8. The protective device according to claim 1 wherein the T-shaped member is made of steel and the post and plate are welded together.

* * * * *